March 16, 1937.  T. B. PRICKETT  2,073,650
AUTOMATIC TEMPERATURE REGULATION OF CONTACT MASSES
Filed Aug. 27, 1935
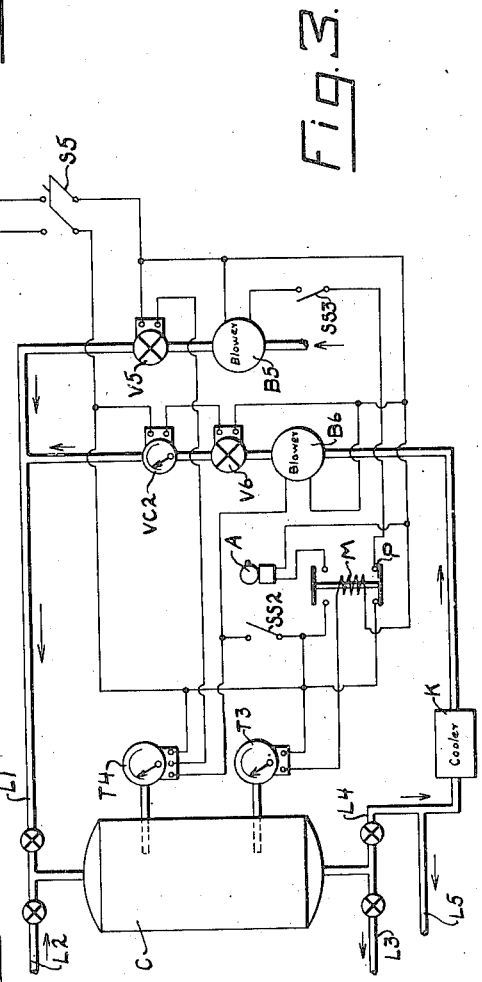
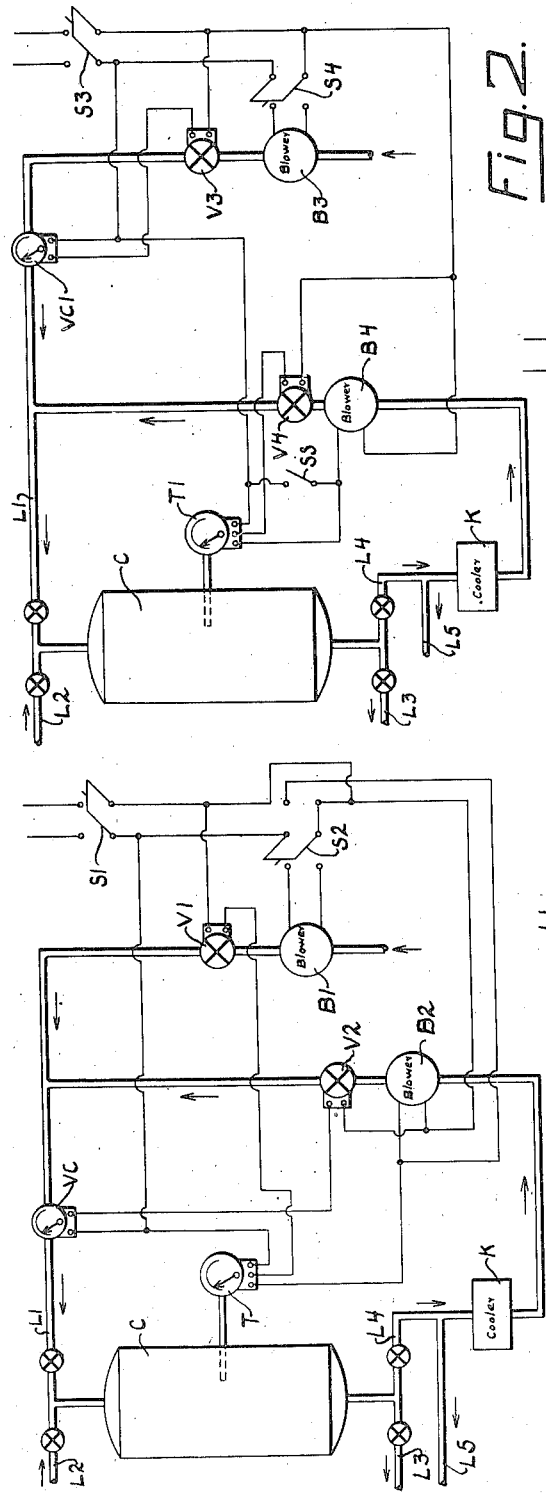
INVENTOR
THOMAS B. PRICKETT
BY
Ira L. Nickerson
ATTORNEY Patented Mar. 16, 1937

2,073,650

UNITED STATES PATENT OFFICE 2,073,650

AUTOMATIC TEMPERATURE REGULATION OF CONTACT MASSES

Thomas B. Prickett, Woodbury, N. J., assignor to Houdry Process Corporation, Dover, Del., a corporation of Delaware Application August 27, 1935, Serial No. 38,021

2 Claims. (Cl. 23—288)

This invention relates to chemical reactions and especially to those in which a contact mass or catalyst is employed. More particularly, it concerns the control of such reactions, e. g., control of reaction temperatures, especially automatic control, and has special application in reactions where two or more dissimilar gases or fluids, for example, an active and a relatively inert gas, are circulated in contact with a catalyst or contact mass. This latter situation may arise in controlled reactivation or regeneration of a bed of contact material.

In the refining, treatment or conversion of hydrocarbons from any source, for example mineral hydrocarbons derived from petroleum or other sources, such materials may be passed in contact with a bed of catalyst or contact material, usually in vapor or atomized form, but in some instances in liquid phase, whereby a refining of such hydrocarbons or conversion thereof into other or lighter products, such as gasoline, is effected. Such a process is involved for example, in Patent No. 1,987,904, issued to Eugene J. Houdry on January 15, 1935. In the course of such conversion, or treatment, carbonaceous, sulphurous or other contaminants, usually primarily of a combustible nature, become deposited on the contact mass and must be removed periodically to restore the mass to a useful or active condition. This may be accomplished by passing a regeneration medium, for example an oxygen bearing gas, through and in contact with the catalyst or contact material. Where an oxygen bearing gas, such as air, is employed, contaminants will be eliminated as gaseous products of combustion.

It is not only desirable and necessary to remove contaminants but to do so without overheating, injuring the porosity, or otherwise substantially adversely affecting favorable properties of the mass.

Control of regeneration may be attained by introducing an inert or relatively inert fluid with the regeneration fluid, in controlled proportions. Where an oxygen containing gas is the regeneration medium, the inert fluid may, for example, consist of flue gas, recycled products of combustion, or other gas which will not support combustion, the temperature of which is suitably adjusted where special cooling or control thereof is necessary, as indicated for example in the co-pending application of Eugene J. Houdry, Serial No. 604,997, filed April 13, 1932. I have found that proportioning of component gases in the combined, composite gaseous mixture may be automatically controlled in response to temperatures developed within the contact mass and that such control is valuable in that it works an improvement in the properties of the resultant regenerated contact mass. This is a primary object of the invention.

Other specific objects of the invention include increasing the life of catalyst or contact mass, avoiding loss of porosity of the same, lowering the time required for regeneration to the optimum minimum, providing a type of control which is positive in its operation, and other desiderata which will appear from the description taken as a whole.

For a quick understanding of the invention, reference may be made to the accompanying drawing showing illustrative embodiments thereof, in which:

Figure 1 shows a type of control wherein the rate of total flow of gases through the converter or contact mass is maintained constant, the proportion of constituent gases being varied to provide temperature control;

Figure 2 differs from Figure 1, in that the flow of air or other active regeneration medium is kept constant and the rate of flow of recycled "flue gas" or products of combustion is varied, and consequently the rate of total flow of gases through the contact mass is varied in holding the temperature of the mass at the desired level; and Figure 3 shows a type of control wherein the rate of flow of recycled products of combustion or equivalent is kept constant and rate of flow of oxygen-containing gas or equivalent is varied to provide temperature control, with consequent variation in the rate of total flow of gases through the contact mass, thus distinguishing from the embodiments shown in Figures 1 and 2.

Reference is now made more in detail to the drawing, in the several figures of which like reference characters denote similar parts and the discussion contemplates a specific treatment involving a contact mass, viz., the regeneration of a bed of catalyst or a contact mass which has become contaminated in the course of cracking or otherwise treating a petroleum oil, as for example happens in the catalytic production of gasoline.

Referring first to Figure 1, C indicates a converter which contains a contact mass and T is a temperature indicating control device having an element thereof extending into the contact mass. VC is a volume control device adapted to maintain constant the flow of gases entering converter C through line L1. During the on-stream portion of the operation, as for example when heavy oil is being cracked to produce gasoline, such oil enters the converter through line L2, for example, and the reaction products are emitted therefrom through line L3. When regeneration is commenced the flow of oil is cut off by closing the valves in lines L2 and L3 and opening the adjacent valves in lines L1 and L4. Air or other oxygen-containing gas is forced by means of impeller or blower B1 through motor controlled valve V1 and line L1 into the converter C. The gaseous products of combustion leave converter C through line L4 and a portion thereof is vented through line L5, while the remainder is passed through cooler K to blower B2, the temperature of the gaseous products of combustion being reduced to any predetermined level as desired. Such temperature may be, for example, 300° F. to 100° F., temperatures of 125° F. being exemplary in various operations such as where maximum optimum regeneration temperatures are of the order of 900° to 1200° F.

At this point it may be helpful to consider that regeneration of a contact mass, from the point of view of optimum control thereof, may be viewed as consisting of three parts: (1) the heating up period, during which temperature of the mass is brought up to the level best for regeneration; (2) the period of equilibrium operation, during which the temperature of the mass preferably remains substantially constant and the bulk of combustible contaminants is eliminated; and (3) the cooling down period, during which the temperature of the mass is reduced from that most favorable for regeneration to that desired for the next on-stream or reaction step.

Assuming that the contact mass is at a temperature of the order of 850° F. and that regeneration is to be effected, switch S1 is first closed and then switch S2 is closed to the left, thereby starting air blower B1. If valve V1 is not in an open position, temperature indicator control device T will operate the motor of valve V1 to open same. When the temperature of the contact mass within converter C builds up to some predetermined level, usually somewhat below the regeneration temperature desired, say, for example, 25° to 100° below the desired temperature, temperature control device T will start the impeller or "flue gas" blower B2. This happens near the close of the first or "heating up period" of the regeneration above referred to. Blower B1 is not alone of sufficient capacity to put control device VC into operation, but when blower B2 starts operating, if valve V2 is completely opened, the rate of total flow of gases through the converter will tend to exceed the desired maximum. However, any increase above such maximum will put into operation volume control VC, which operates to actuate motor-controlled valve V2, closing the same a suitable amount. Valve V1 will remain entirely opened until the temperature within converter C reaches and tends to exceed that desired, say, 1050° F. Any increase in temperature above this level will cause control device T to actuate the motor of motor-controlled valve V1, thereby to close the same a suitable amount, even to the extent of completely closing it if the temperature rises above a predetermined maximum. Thus, as can be seen, when the air flow is decreased to keep the temperature from rising above that desired within the converter C, volume control device VC operates on valve V2 to correspondingly increase the rate of flow of recycled products of combustion, thereby maintaining the total flow of gases through the converter C at a constant rate. After the second or equilibrium period of regeneration is reached the regeneration will proceed smoothly with only slight, if any, adjustment of air to "flue gas" being required until nearly all of the combustible material is burned from the mass. When this happens the controls will operate to increase appropriately the proportion of oxygen-bearing gas to "flue gas". This is brought about as follows:

Control device T will again operate to reverse the motor of valve V1, so as to open the same, thereby increasing the air flow. Volume control device VC will then be put in operation and will act to reverse the motor of valve V2 so as to close the same a suitable amount to compensate for the increase of air flow. When substantially all of the combustible deposits are burned from the contact mass, the temperature thereof will fall despite increases in proportion of air to "flue gas". This marks the beginning of the third or "cooling down" period of regeneration.

The capacity of blower B2 may be, for example, about 4 or 5 times the capacity of air blower B1. Therefore, if when regeneration is completed and it is desired to cool the contact mass down to suitable on-stream temperatures, for example, 875° F. and lower, more rapid cooling may be obtained by throwing switch S2 to the right, thereby putting into operation the larger blower B2 and cutting out of operation the air blower B1.

Blower B1 has a maximum capacity approaching or somewhat lower than that of the maximum flow of fluid which volume control VC is set to permit passage of.

Described differently, it is a rate of flow which will produce a rise in temperature, for example, of the order of about 5° to 15° F. per minute.

It is contemplated to commence regeneration after the contact mass has been used for catalytic conversion or comparable treatment of petroleum oil. Where the contact mass at the end of the contacting treatment is below the temperature range within which regeneration can readily be initiated, the same must be heated or the oxygen-containing regeneration fluid must be introduced at a sufficiently high temperature to institute combustion.

As can be seen from the above description, the air feed is controlled with increasing temperatures to give a graduated or gradual decrease in the oxygen content of the regeneration fluid, from say 10% at the temperature existing in the mass immediately after the "flue gas" blower has commenced operation to say 6% or less at the maximum optimum regeneration temperature. This gradual and uniform control is in contradistinction to the irregular control which is inevitable where any type of practical manual control is attempted.

To simplify and clarify the understanding of the present invention, Figure 1 and also the other figures of the drawing are highly diagrammatic in character. It is to be understood that relays, solenoids, dampeners, or the like, are to be employed in connection with temperature control device T and volume control device VC, to obviate or minimize hunting of the motors or to iron out other irregularities of operation. Other electrical equipment necessary or desirable for smooth or suitably balanced operation is likewise contemplated.

The use of such dampening devices may permit a very slight fluctuation of temperature within the converter C; particularly during the equilibrium period of regeneration; however, the control mechanism is thereby made to operate smoothly and the resultant control is much more satisfactory.

The schematic showing of apparatus in Figure 2, where the flow of air or other active, regeneration medium is kept constant, can readily be understood from the description given above, with slight additional discussion. Switch S3 corresponds to switch S1; switch S4 to switch S2; blower B3 and valve V3 to blower B1 and valve V1, respectively; blower B4 and valve V4 correspond to blower B2 and valve V2; temperature control device T1 to device T; and volume control device VC1 to the corresponding device VC. With this apparatus the regeneration operation is commenced by closing switches S3 and S4, which starts blower B3, sending a flow of air or oxygen containing gas through the contact mass within converter C. The flow of air is maintained substantially at a predetermined constant by control device VC1, which operates to appropriately adjust motor-controlled valve V3, depending upon the back pressure in the line L1. (The back pressure varies, depending upon whether or not blower B4 is in operation and, if it is, depending upon the rate of recirculation of "flue gases" permitted by valve V4.)

After the air has continued to pass through the converter for a period of time until the temperature of the contact mass therewithin has risen to some predetermined level, usually approaching but less than the equilibrium regeneration temperature, control device T1 operates to set in motion blower B4. If the temperature tends to rise above that desired, device T1 operates to actuate motor control valve V4 to open the same so as to increase the circulation of cool, inert gas. On the other hand, if the temperature of the converter C tends to drop below the desired temperature, control device T1 causes motor-controlled valve V4 to reverse its direction to close the valve somewhat, thus decreasing the flow of cool, inert gas.

When regeneration is completed and it is desired to cool down the contact mass within the converter to suitable reaction temperatures, switch SS may be closed if it is desired to have blower B4, as well as blower B3 operate. It is optional to have either or both blowers in operation during the cooling-down period of the regeneration step.

In the apparatus shown in Figure 3, as above briefly indicated, the flow of "flue gas" or recycled products of combustion is kept substantially at a constant and the rate of flow of air is varied to obtain the desired temperature control. Regeneration is commenced by closing switch S5, which starts blower B5 in motion (switch SS3 being normally in closed position), temperature control device T4 operating at such temperatures so as to open motor-controlled valve V5 if the same is in closed position. When the temperature within the converter C rises to some predetermined level, usually somewhat below the equilibrium regeneration temperature, control device T4 operates to start blower B6 in motion. Immediately volume control device VC2 operates to control valve V6 so that the latter permits a predetermined and substantially constant circulation of "flue gas". As the temperature of the contact mass within converter C tends to rise still further, control device T4 operates to actuate motor-controlled valve V5 so as to close the valve somewhat, thereby to reduce the air flow sufficiently to curb the temperature rise within the converter as desired. With each variation in the rate of air flow, some adjustment of motor controlled valve V6 will take place in order to maintain constant the rate of flow of "flue gases", despite variations of the partial pressure of air in line L1.

When the main part (the equilibrium portion) of the regeneration is complete and it is desired to cool the contact mass down to suitable onstream temperature, switch SS2 may be closed, whereby both blowers are kept in operation; or single switch SS3, which is normally closed during regeneration, may be opened, thereby eliminating oxygen from the cooling medium, if desired.

If, during regeneration, the temperature of the contact mass should, for some reason or other, rise to some predetermined excessive point, temperature control device T3 will energize electromagnetic coil M which will break the connection to blower B5 at point P and also set in operation alarm signal A. The electro-magnetic switch may be, in effect, a circuit-breaker which needs to be hand set to again start blower B5.

The apparatus shown in Fig. 1, in certain respects, has advantages over the other embodiments shown, in that the flow of gases through the contact mass is kept at a constant, and controlled regeneration at a desired, rapid rate, can be obtained by passing a minimum volume of gases.

While all of the illustrative control systems shown contemplate maintaining constant either the flow of air, the flow of recycled products of combustion, or the total flow of those gases combined, yet it is to be understood that it is not absolutely essential for any one of the three flows to be actually constant. So long as a control of the relative amounts of air and "flue gas" is maintained, a control of the temperature within converter C can likewise be regulated.

By way of illustrating specific, operable equipment which may be employed in my invention to effect the desired automatic control, the volume control device VC, VC1 or VC2, may, for example, be the "Electric flow meter" manufactured by The Brown Instrument Company of Philadelphia, Pa., and illustrated, for example, on page 62 of the "Composite Catalog of Oil Refinery Equipment" (4th Ed., 1934), published by the Gulf Publishing Company, Houston, Texas. A similar device, manufactured by the Foxboro Company of Foxboro, Mass., is illustrated in the same publication. Temperature control device T, T1, or T4 may for example, be the "Micromax balancing anticipating recording controller" manufactured by the Leeds and Northup Company of Philadelphia, Pa., and illustrated on page 120 of the above publication. Device T3 may consist of simple conventional equipment.

These control devices also contemplate suitable valves, for example motor valves, to make their control complete. However, motor valves are themselves common and well-known; see, for example, pages 1653 et seq. of the Chemical Engineers Handbook (1934) published by The McGraw-Hill Book Company, Inc., New York city.

While the invention has been discussed primarily in connection with the regeneration of a contact mass used for the conversion, treatment or catalysis of petroleum hydrocarbons, it will be understood that the same has a broad application to any type of process, wherein a composite gas or fluid may be passed into a treating chamber or in contact with a contact mass and where it is desirable to control the temperature of such chamber or mass. This system of control could readily be applied to various other exothermic contact treatments of fluids, particularly where a composite fluid, comprising a relatively active and a relatively inert gas, is circulated through a reaction chamber or contact mass, and also it could readily be applied to various endothermic treatments of fluids. Such equivalent applications are comprehended within the scope of the appended claims.

What I claim is:

1. In apparatus for effecting contacting actions including a casing providing a chamber, a contact mass within said chamber, and openings in said casing for admitting fluids to be treated and regeneration fluid and for withdrawing treated fluid and products of regeneration, the combination therewith of apparatus for carrying out regeneration and adapted to control automatically the temperature of said contact mass during regeneration comprising a conduit connected with said chamber through which a regeneration fluid may be introduced thereinto, communicating branch conduits through which air and an inert gas may respectively be introduced into the first-mentioned conduit, an impeller in each of said branch conduits for forcing fluid therethrough, a motor valve in each of said branch conduits, a temperature control device adapted to adjust the valve in one of said branch conduits, to open or close the same, in direct response to fluctuations in temperature within said contact mass so as to counteract said fluctuations, and a volume control device in said first-mentioned conduit and adapted to control the valve in the other of said branch conduits oppositely to that of the valve in the said one of said branched conduits so as to maintain the combined flow of fluids through said first-mentioned conduit substantially constant.

2. In apparatus for effecting contacting actions including a casing providing a chamber, a contact mass within said chamber, and openings in said casing for admitting fluids to be treated and regeneration fluid and for withdrawing treated fluid and products of regeneration, the combination therewith of apparatus for use in carrying out regeneration and adapted to control automatically the temperature of said contact mass during regeneration comprising temperature responsive means positioned with relation to said casing so as to be responsive to changes in temperature of said contact mass, a supply duct for the active component of said regeneration fluid, adjustable means associated with said duct for increasing and decreasing the rate of flow therethrough, relay means connecting said temperature responsive means with said adjustable means and adapted to regulate the latter so as to decrease the rate of supply of active fluid with increases in temperature in the contact mass and to increase such rate with decreases in temperature therein, a supply duct for the inert component of said regeneration fluid, a flow regulator located in said last-mentioned duct, a conduit to which both of the aforesaid ducts are joined, said conduit being also joined to said casing in registering relation with the aforesaid opening for admitting fluids, a constant volume control device located in said conduit, said device being responsive to changes in rate of flow away from a predetermined desired rate, relay means connecting said volume control device to said flow regulator and adapted to effect such an adjustment in said flow regulator with each response in said control device as to maintain a substantially uniform rate of flow through said conduit.

THOMAS B. PRICKETT.